United States Patent [19]
Kelson, Sr.

[11] 3,714,930
[45] Feb. 6, 1973

[54] ROTARY ENGINE

[76] Inventor: Malcolm J. Kelson, Sr., 10260 East Outer Drive, Detroit, Mich. 48224

[22] Filed: Oct. 5, 1971

[21] Appl. No.: 186,657

Related U.S. Application Data

[63] Continuation-in-part of Ser. No. 67,374, Aug. 27, 1970, abandoned.

[52] U.S. Cl..................................123/8.27, 418/246
[51] Int. Cl........................F02b 53/00, F02b 55/08
[58] Field of Search ...123/8.01, 8.27, 8.31; 418/242, 418/244, 246

[56] References Cited

UNITED STATES PATENTS

| 892,201 | 6/1908 | Welsh et al. | 123/8.31 |
| 1,136,344 | 4/1915 | Keil | 123/8.31 |
| 3,478,727 | 11/1969 | Marcoux | 418/246 X |

FOREIGN PATENTS OR APPLICATIONS

| 178,040 | 11/1906 | Germany | 123/8.31 |

*Primary Examiner*—Carlton R. Croyle
*Assistant Examiner*—Michael Koczo, Jr.
*Attorney*—James W. Bock

[57] ABSTRACT

A rotary internal combustion engine includes an engine block having a cylindrical chamber in which is rotatably mounted a power rotor having piston lobes which act in concert with a plurality of rotary valves located about the periphery of the cylindrical chamber so as to provide explosion impulses which act upon the lobes to drive the rotor.

7 Claims, 9 Drawing Figures

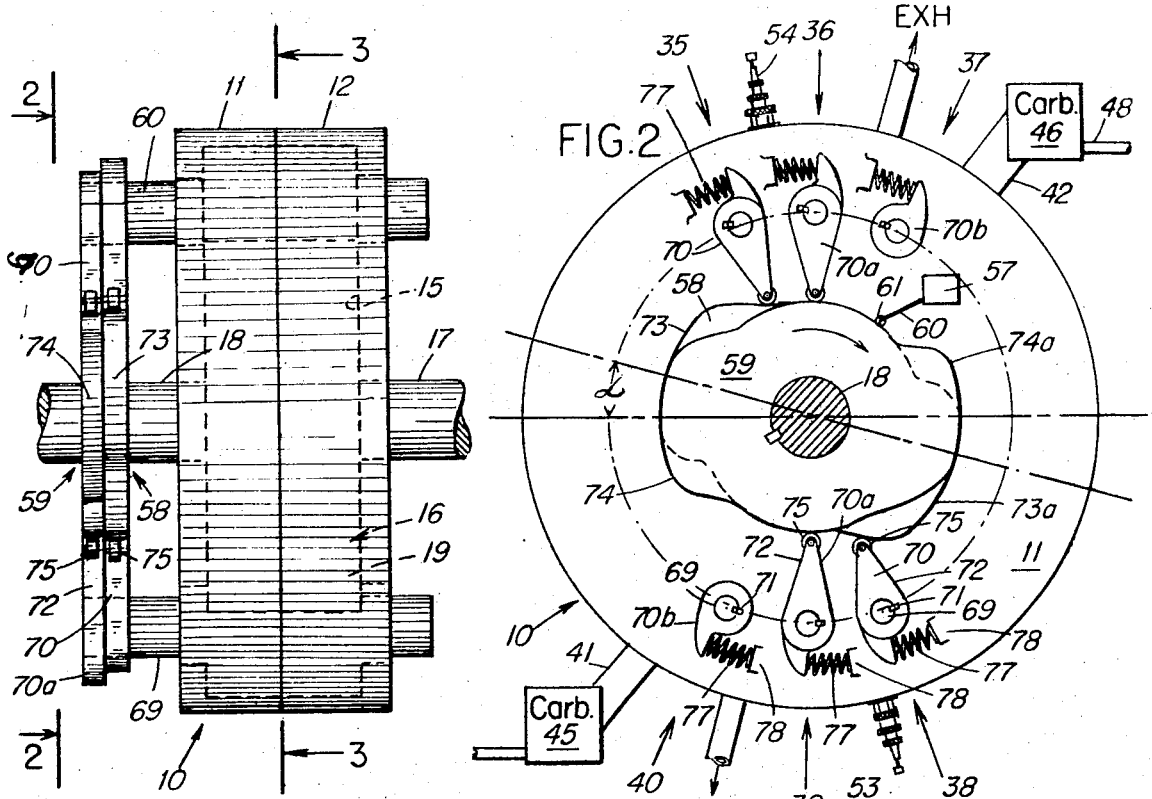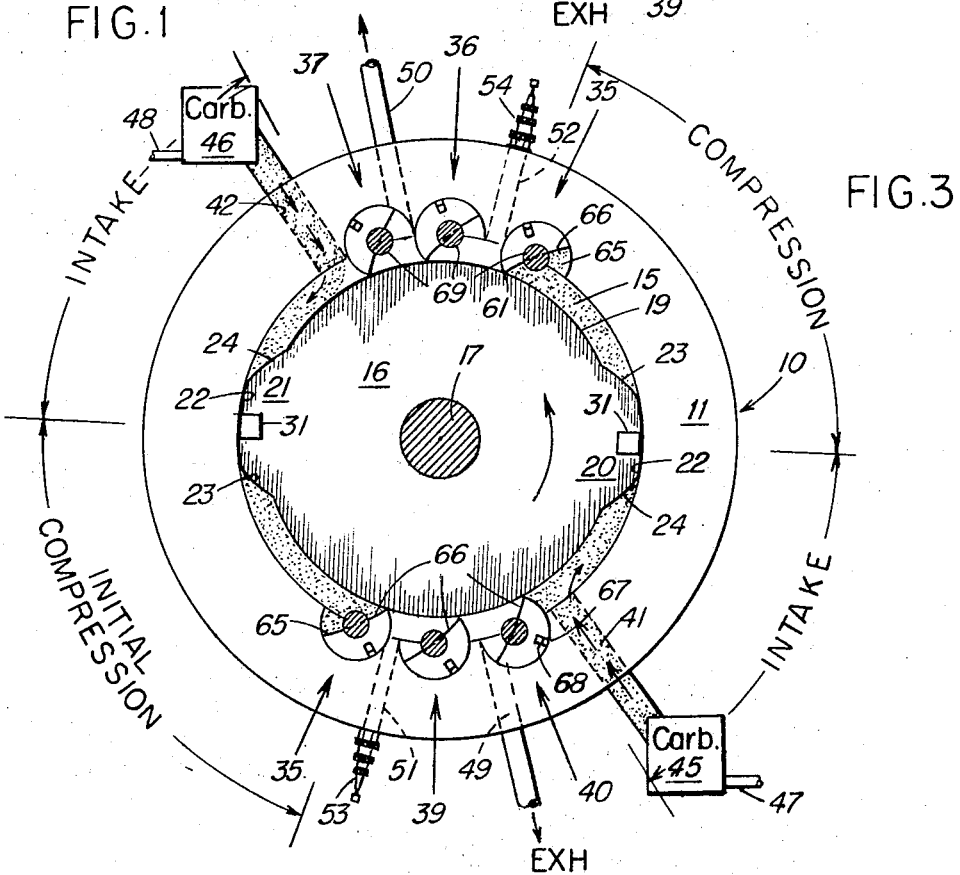

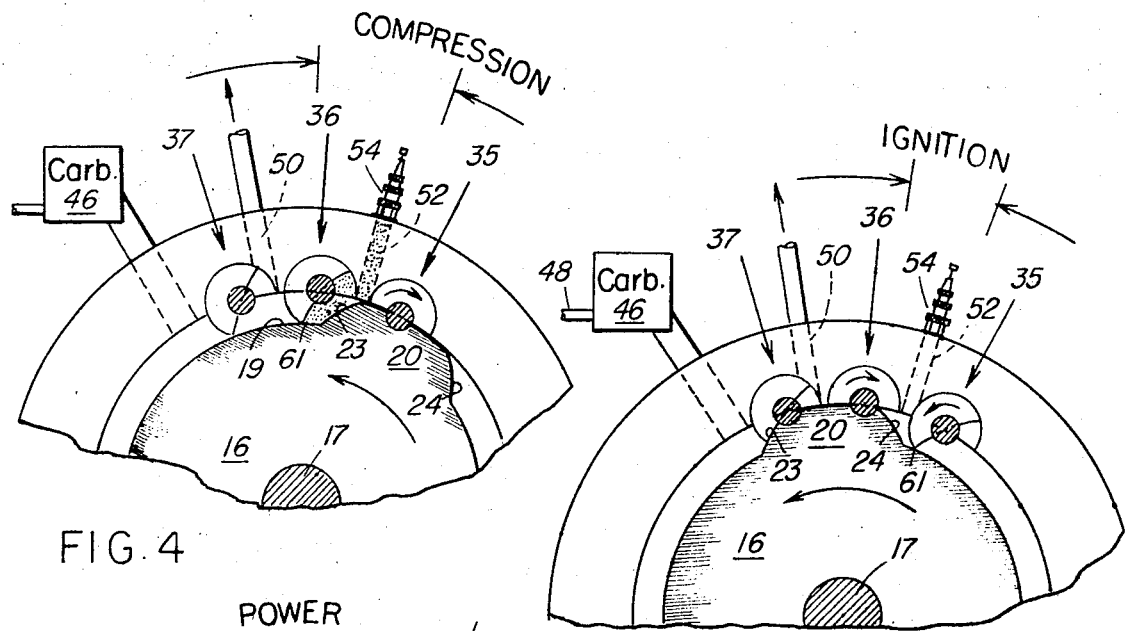
FIG. 4
FIG. 5
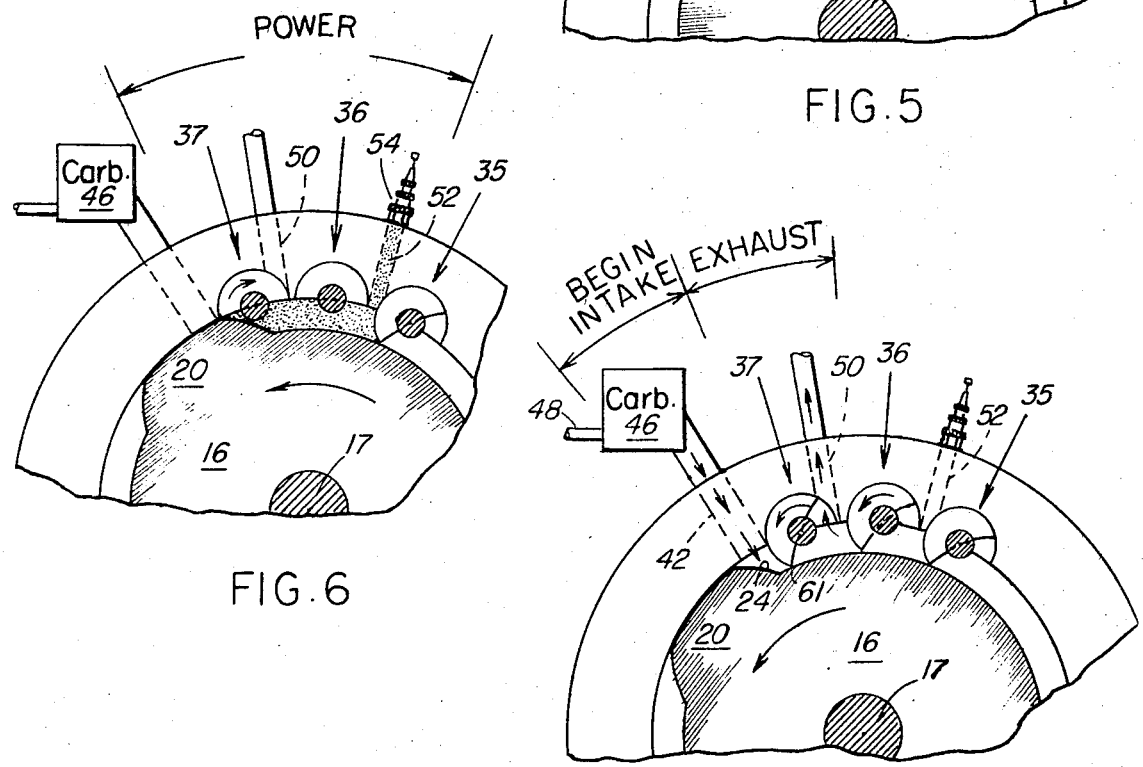
FIG. 6
FIG. 7

FIG. 8
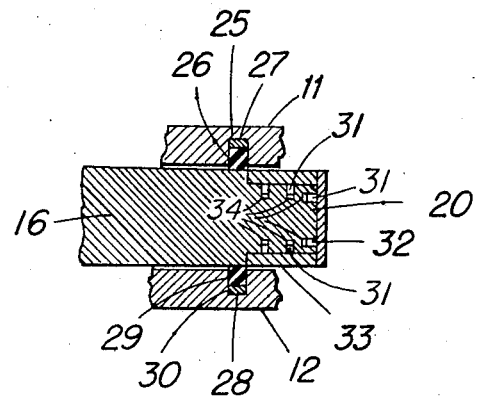
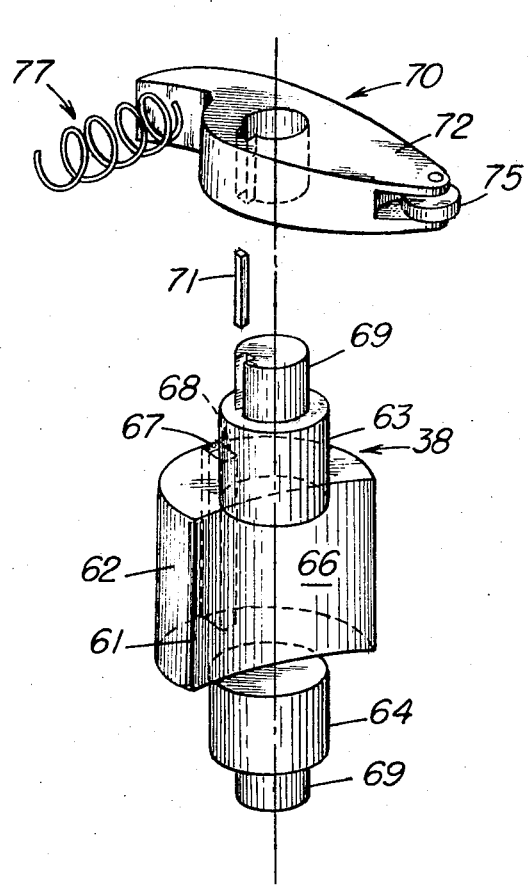
FIG. 9

ROTARY ENGINE

This application is a continuation-in-part of my application Ser. No. 67,374, filed Aug. 27, 1970, and now abandoned.

SUMMARY OF THE INVENTION

The present invention relates generally to rotary internal combustion engines. More particularly, it relates to a rotary internal combustion engine having a power rotor with at least one rotor borne piston lobe, and means for intaking, compressing, igniting and exhausting a fuel and air charge as the rotor revolves. In the preferred and below described embodiment, the rotor is provided with two lobes and two sets of valves in diametric opposition to provide four explosive power impulses to the rotor per revolution of the rotor. The preferred two lobe embodiment forms a basic building block unit which can be combined with similar units to provide a multiple unit engine assembly. The present invention constitutes an improvement over rotary engines such as those described in U.S. Pat. No. 3,478,727 and French Pat. No. 1,320,880.

The engine of the present invention maximizes the arcuate length of the power phase while using closely spaced valves to permit the use of multiple sets of valves, insures complete removal of exhaust gases, permits construction of versions having multiple power explosions during each rotor revolution for power and smooth operation and balances each such explosion with a diametrically opposite simultaneous explosion for reduction of asymetrical stresses and utilizes but few parts each of which is durable and readily manufactured.

The rotary internal combustion engine of the illustrated embodiment described below includes an engine block or housing having a cylindrical chamber in which is rotatably mounted a power rotor provided with axially extended end shafts either of which can be adapted to function as a power output shaft. The rotor includes a balanced pair of diametrically opposed piston lobes. Two sets of three rotary valves are disposed around the periphery of the engine block cylindrical chamber and a timing means is provided to appropriately open and close these valves so as to provide an explosive impulse against the piston lobes at the rate of 4 such explosions per revolution of the power rotor. The rotary valves coact with each of the piston lobes to provide an intake stage, a compression stage, a firing stage, and an exhaust stage for each explosion. The engine is provided with suitable ignition means such as conventional spark plugs and timed spark source for igniting the air-fuel explosive charge at the proper time.

It is an object of the present invention to provide an improved rotary internal combustion engine.

It is another object of the present invention to provide an improved rotary internal combustion engine which has a number of power impulses per revolution of the rotor equal to the product of the number of valve sets multiplied by the number of rotor lobes so as to maximize the power per unit of weight, and to develop a steady flow of power.

It is another object of my invention to provide a rotary engine unit which is readily capable of combination with other such units to form an axial array of plural units as an engine assembly, the number of units in the array being chosen to fit the power requirements.

It is another object of the present invention to provide a rotary internal combustion engine which is simple and compact in construction, economical to manufacture, and efficient in operation.

It is a still further object of the present invention to provide a rotary internal combustion engine employing an intake, compression, ignition, and exhaust cycle of operation, comprising an engine block; a cylindrical rotor chamber formed in said engine block; a power rotor rotatably mounted in said chamber and having an axial shaft whose ends extend outwardly through said block, said power rotor being provided with a plurality of lobes in a dynamically balanced relationship; a plurality of sets of rotary valves being mounted in said engine block about the chamber periphery in spaced locations, each of said sets of rotary valves including a first valve, a second valve and a third valve; the space in said rotor chamber between the third valve of one set of valves and the first valve of the next set of valves forming an intake chamber connected to an air-fuel mixture supply and, subsequent in the cycle, forming a compression chamber; the space between the first and second valves in each set of valves comprising a combustion chamber; the space in said rotor chamber between said second and third valves comprising an exhaust chamber connected to an exhaust passage leading to the atmosphere; the third valve serving to seal off the exhaust passage during the power phase in the cycle; means for biasing each of said valves to a closed position; cam means for turning the first valve in each set of valves against the action of said biasing means to an open position at an appropriate point in the cycle; and, cam means to maintain the second valve in each set of valves open during an appropriate period in the cycle.

Other objects, features and advantages of this invention will be apparent from the following detailed description, appended claims, and the accompanying drawings which illustrate a basic embodiment having two lobes on the rotor and two sets of valves in which;

FIG. 1 is a side elevational view of the engine assembly;

FIG. 2 is an elevational view of the cam end of the engine;

FIG. 3 is a view in partial section of the interior of the engine taken along plane 3—3 of FIG. 1 with the rotor at a position for the intake and initial compression stages of the cycle of operation;

FIG. 4 is a partial view similar to FIG. 3 with the rotor at a position for the final compression stage;

FIG. 5 is a view similar to FIG. 4 with the rotor at a position for the ignition stage;

FIG. 6 is a view similar to FIG. 4 with the rotor at a position for the power stage;

FIG. 7 is a view similar to FIG. 4 with the rotor at a position for the exhaust and initial intake stages;

FIG. 8 is a partial detail view of the rotor lobe seal; and

FIG. 9 is an exploded perspective view of one of the valves and its cam follower rocker arm.

Referring now to the drawings, and in particular to FIGS. 1, 2 and 3 wherein there is shown an illustrative embodiment of the invention, the numeral 10 generally designates an engine block, or engine housing. The engine block 10 comprises a pair of substantially identical half-block members, or half-housing members, which may be termed as the engine front block member 11 and the engine rear block member 12. The engine block members 11 and 12 may be secured together by a suitable means, as by bolts. The block members may be provided with a water jacket or heat exchange fins for cooling purposes. As shown in FIGS. 1–3 the engine block 10 has formed therein a cylindrical chamber 15 in which is rotatably mounted a power rotor generally indicated by the numeral 16. The power rotor 16 includes a power output end shaft 17 and a timing control end shaft 18. The power rotor 16 further includes a pair of diametrically disposed, radially extended piston lobes 20 and 21 which stand proud of the otherwise cylindrical peripheral surface 19 of the rotor 16.

As shown in FIG. 3, the piston lobes 20 and 21 have an outer peripheral end face 22 rounded to conform to the chamber periphery, a leading face 23, and a trailing face 24. The contour of faces 23 and 24 is not particularly critical and may be chosen for ease of machining, control of flame propagation, smooth rotary acceleration of the valves and other considerations which are apparent to those skilled in the art. As shown in FIG. 8, the front engine block 11 is provided with a suitable annular sealing member 26 which is slidably mounted in a recess 25 formed in the inner face of the block 11. The sealing member 26 is normally biased inward into sealing engagement with the adjacent surface of the rotor 16, by any suitable means as by an annular spring means 27. The engine rear block 12 is also provided with a similar annular sealing member 29 which is disposed in an annular recess 28 and biased toward the rotor 16 by a spring 30.

As shown in FIGS. 3 and 8, the piston lobe 20 is provided with sealing members 31, 32 and 33 which are slidably mounted in recesses on the top, outer peripheral face, and bottom of the rotor. The sealing members 31, 32 and 33 are biased outwardly by suitable means such as springs 34. The other rotor piston lobe 21 is also provided with similar sealing members. The sealing members may be of metal and operate in a manner well known in this art.

As shown in FIG. 3, the engine of the present invention is provided with a plurality of substantially identical rotary valves 35–40 for controlling the intake, compression, ignition, power and exhaust stages for each explosive reaction against each of the piston lobes 20 and 21. One such valve is shown in perspective in FIG. 9. The valve includes a trunion shaft 69 having journal surfaces 63 and 64 which rotate in suitable bearings in the engine block. The central body portion 62 of the valve is a segment of a cylinder terminated in an arcuate face 66 of the same radius as the peripheral wall of the cylindrical chamber of the engine block. The face 66 constitutes a continuation of the cylindrical chamber wall when the valves are appropriately positioned. The intersections of that cylindrical surface of the body 62 and surface 66 are edges 61. The central body portion 62 of each valve is provided with a seal member 67 biased radially outward by a spring 68. The seal bears with wiping motion against the cavities 65 of the engine block in which the valves reside as can be seen in FIG. 3. Similar seals of annular shape may be employed on the ends of the valve body 62.

The valves are closely arranged in sets of three at generally equiangular spacings. In the illustrated embodiment the two sets are diametrically opposed about the chamber periphery. One set comprises valves 35, 36 and 37 and the other set comprises valves 38, 39 and 40. The valves of each set are positioned in the cavities 65 in the block such that their faces 66 can be aligned as continuations of the chamber peripheral wall surface. Shaft 69 of each valve is adapted to receive a rocker arm 70 by such means as a key 71.

As is shown in FIGS. 1—3, the illustrated embodiment employs a pair of diametrically opposed intake ports 41 and 42 which extend from conventional carburetors 45 and 46 through the block 10 into the chamber 15. An appropriate fuel supply is provided through fuel lines 47 and 48. It is apparent that the intake ports 41 and 42 could as well lead from a manifold having one or more carburetors. It is further apparent that conventional fuel injection can be employed. The block is also provided with diametrically opposed exhaust ports 49 and 50 closable by valves 40 and 37 respectively and spark plug bores or cavities 51 and 52. The spark plug cavities constitute a portion of the combustion chamber and are fitted with appropriate conventional spark plugs 53 and 54. Although illustrated as being straight cylindrical bores 51 and 52, the combustion chamber purpose of the bores can as well be served by chambers or cavities of other shapes. The spark plugs are connected to a timed spark source such as a conventional magneto or coil and distributor or the like. The ignition timing information can be in the form of low voltage pulses derived from switch 57 shown in FIG. 2. The switch includes an actuator arm 60 and cam follower 61 which rides on the cams 58 and 59 which are described below. The design of specifics of the ignition system is well within the skill of the art.

The valve timing cam assembly and arrangement is shown in FIG. 2. Each of the valves 35–40 have affixed to their trunion shafts 69 a rocker arm 70. The rocker arms 70 on the first valves 35, 38 and arms 70a on the second valves 36, 39 include a lever arm portion 72 which terminates in a roller 75 which bears on the contoured surface of the cams 58,59 thereby constituting cam followers. Rocker arms 70b affixed to the third valves 37, 40 have no such cam follower assembly. Each of the rocker arms 70, 70a, and 70b acts against a compression spring 77 having an end which bears on a boss 78 affixed to the block. Torsional springs could as well be used. Springs 77 bias the rocker arms and associated valves clockwise in FIG. 2. Rotor shaft end 18 has affixed thereto a pair of cams 58 and 59 which may be integrated into a single cam with two contour surfaces. Cam 58 includes two cam lobes 73 and 73a and cam 59 includes two cam lobes 74 and 74a. As the cam 58 rotates with the rotor, lobes 73 and 73a are followed by the roller 75 of rockers 70 to cause the first valves 35 and 38 to rotate counterclockwise in FIG. 2 as the lobes pass. The springs 77 return the valves 35 and 38 clockwise after a cam lobe passes. It is apparent that one lobe of cam 58 acts on valve 35 in synchronism with the other lobe and valve 38. Cam 59 operates in a similar fashion via lobes 74 and 74a acting on rockers 70a associated with the second valves 36 and 39. The lobe pairs of the two cams 58 and 59 are displaced relative to each other by an angle $\alpha$ which is determinative of the relative angular timing of the first and second valves. The third valves 37 and 40 are not acted upon by a cam.

It is apparent that the valves can be actuated by well known valve actuating alternatives to the above specifically described rocker arm cam follower mechanism. The art of internal combustion engine valve actuation is well developed.

OPERATION

FIGS. 3–7 illustrate the sequence of events in a cycle of operation of an engine having two rotor lobes and two sets of valves yielding four power explosions for each rotor revolution. The operational description deals with the events at one of the two set of valves, namely valves 35–37, and as one rotor lobe 20 travels counterclockwise through that valve set. An identical sequence of events occurs simultaneously with rotor lobe 21 and the valves 38–40 of the second set. Further, the described sequence also occurs later when lobes 21 and 20 come into action with the first set of valves (35–37) and the second set of valves (38–40) respectively. Thus, the sequence occurs four times for each rotor revolution.

Turning now to FIGS. 3–7, FIG. 3 shows rotor lobe 20 in counterclockwise motion midway between the third valve 40 of the lower set and the first valve 35 of the upper set upon which attention is focused. A fuel-air mixture located between leading face 23 of lobe 20 and the now closed first valve 35 is being compressed. The seal 31 illustrated in detail in FIG. 8 prevents the compressed mixture from escaping around the outer end 22 of lobe 20. First valve 35 is shown closed by the bias of spring 77 acting on rocker arm 70. The sealing edge 61 of the valve body bears against the cylindrical portion 19 of rotor 16 in advance of lobe 20 to form a seal. Compression takes place between edge 61 and the advancing face 23 of lobe 20. As the lobe 20 continues to advance, leading face 23 comes into proximity with face 66 of valve 35. A cam lobe 73 or 73a of cam 58 (shown in FIG. 2) now causes rocker arm 70 to rotate by the follower action of roller 75 to rotate valve 25 into the open position whereat valve face 66 becomes an extension of the chamber wall, as is shown in FIG. 4.

FIG. 4 shows the fuel-air mixture as it is further compressed between advancing face 23 of lobe 20 and the closed second valve 36 whose edge 61 sealingly bears on the cylindrical portion 19 of the rotor 16. The highly compressed fuel-air mixture is thereby forced into the spark plug bore or combustion chamber cavity 52 where it is ready for ignition.

FIG. 5 shows the lobe 20 after it has advanced beyond the spark plug bore and after ignition has taken place. The gases of the explosion expand against the retreating face 24 of lobe 20 where they exert pressure to result in the power force which drives the rotor. The explosion pressure is contained by edge 61 of the first valve 35. In attaining the rotor lobe position illustrated in FIG. 5, the leading face 23 of lobe 20 has come into contact with face 66 of second valve 36 thereby directly causing valve 36 to be rotated clockwise into the open position. Rocker arm 70a of valve 36 bears on cam 59, but cam lobes 74 or 74a do not cause opening of valve 36 by cam follower action as was the case with valve 35. Rocker arm 70a of valve 36 only employs cam follower action to sustain valve 36 in the open position for the duration of the power stage illustrated in FIG. 6.

FIG. 6 shows the further advance of lobe 20 and the continued expansion of the gases generated by the explosion. At the position illustrated in FIG. 6, nearly all the force available from the explosion has been spent in driving the lobe 20. Only exhaust gases remain in the chamber. In the period between FIGS. 5 and 6 leading face 23 of lobe 20 has contacted the third valve 37 and caused it to rotate clockwise to the open position shown in FIG. 6. Valve 37 has no cam follower and opens and closes solely by contact with lobe 20 under the bias of its spring 77. As with the other valves of the set, its spring 77 biases valve 37 toward counterclockwise closure with edge 61 bearing against the cylindrical portion 19 of rotor 16. In the open condition illustrated in FIG. 6, valve 37 closes off the exhaust port 50 to permit full realization of the energy of the explosion by the rotor lobe 20. FIG. 6 illustrates the end of the power stage.

FIG. 7 shows lobe 20 further advanced to where third valve 37 has again closed by counterclockwise rotation under spring bias. Edge 61 of valve 37 rides down retreating face 24 of lobe 20 to reestablish sealing engagement with the cylindrical portion 19 of the rotor 16. As valve 37 closes counterclockwise it opens exhaust port 50 to the atmosphere permitting the escape of the spent explosion exhaust gases. Second valve 36 has been sustained open by cam follower action since the conditions of FIG. 5 caused its opening. It is now allowed to close counterclockwise under the bias of its spring 77 as its follower 70a rides down the retreating face of the lobe 74 or 74a of cam 59.

As lobe 20 continues to rotate, a partial vacuum is created between the retreating face 24 of lobe 20 and the edge 61 seal of the third valve 37. This partial vacuum draws a new fuel-air charge through the intake port 42 from the carburetor 46. The charge continues to be drawn until the lobe 20 passes the first valve 38 of the second set. The charge remains in this location until the other lobe 21 enters the charge containing portion of the chamber to begin compression. Returning now to FIG. 3 with which the described sequence began, it can be observed that a charge is simultaneously drawn in by the retreating face 24 of each lobe concurrent with the compression of the previously drawn charge by the leading face 23 of each lobe.

Second valves 36, 39 and third valves 37, 40 unlike first valves 35, 38 are not opened by cam follower action, but are forced open by contact with the advancing rotor lobes. This avoids problems of opening timing with respect to those valves and insures that no residium of the charge remains isolated from the explosion. Further, direct actuation of these valves renders the operation of the engine insensitive to valve mechanism wear and eliminates the need for adjustability. The only valves opened by cam follower action are the first valves, and their opening timing is not particularly critical to the operation thereby rendering these valves insensitive to wear and adjustment as well.

The use of cam follower action to sustain the second valves 36 and 39 open prolongs the useful power stroke to permit maximum extraction of energy from the explosion and permits complete exhaustion of spent gases. Similarly, this maximization of energy extraction is aided by sustaining the exhaust ports 49 and 50 closed until the rotor lobes have cleared the third valves 37 and 40. In this manner high effeciencies are attained while permitting relatively close angular spacing of the valves of each set, thereby allowing the use of many valve sets spaced about the periphery of the engine block.

The above described sequence occurs simultaneously at each lobe and valve set with the result of four complete combustion cycles for each revolution of the illustrated two rotor lobe and two valve set engine. It is apparent that three lobes and two valves sets will yield six complete cycles and three lobes and three valve sets will yield nine complete cycles per revolution of the rotor. The number of complete cycles per revolution is the product of the number of lobes and valve sets per rotor unit.

For a four lobe, four valve set engine unit according to the present invention, the result is 16 power impulses per revolution, yielding a smooth and even power output to the rotor shaft. Such a four lobe, four valve set engine is to be contrasted with a conventional four cycle reciprocating engine which has but one power impulse for each two engine revolutions for each cylinder. It would take a 32 cylinder, 64 valve engine to produce the 16 power pulses per revolution produced by a four lobe, four valve set engine according to the present invention. With the present invention there would be but one major moving part, the rotor, and but 12 valves.

Unlike conventional engines, the rotor of the present invention is inherently balanced and the valves enjoy a purely rotary motion having inherently low inertia. The distance which relatively moving parts travel per revolution is but a fraction of that of a conventional piston engine. Further, it should be recalled that no parts motion is devoted to a non-powered stroke as in a four cycle piston engine. The low relative parts motion of the present engine is a very significant factor in terms of fuel and weight efficiencies and low wear. The inherent rotor and valve mechanism balance, low relative parts motion, and low inertia of the valve train permit the construction of light weight alloy engines capable of high speed operation with low wear.

Unlike piston engines, the thrust of the explosion is not borne by crankshaft or rod bearings. Each explosion force component is balanced by an opposed explosion force component with little or no net force to be borne by bearings. The explosions are symmetrically balanced by other simultaneous peripherally spaced explosions. This symmetrical balance reduces internal stress in the engine. When this symmetrical balance is coupled with the steady torque of a high number of power impulses per revolution, the load on the bearings is very substantially less than in piston engines. No counterweights are needed. The entire assembly can be lighter than a piston engine of the same power and life expectancy. These several advantages combine to yield an engine of high power output per unit of mass or volume.

The described embodiment is well adapted to be axially coupled to similar units to provide an engine assembly having plural rotors on a common shaft. The rotors can be angularly phased to provide a dynamically balanced uniform succession of power impulses for smooth power. The power requirements determine how many units would be assembled into one engine. The engine units are unlimited in diameter and are limited in axial depth only by flame propogation considerations.

It is apparent that the present invention is as well suited to diesel or other compression-ignition operation as it is to the described spark ignition operation.

What is claimed is:

1. A rotary internal combustion engine comprising:
   a. an engine block;
   b. a rotor chamber having a cylindrical peripheral wall formed in said engine block;
   c. a power rotor rotatably mounted in said chamber;
   d. said power rotor being provided with at least one piston lobe which extends to said cylindrical wall;
   e. at least one set of first, second and third rotary valves being mounted in said engine block along the periphery of said chamber;
   f. each of said rotary valves being capable in one position of sealingly contacting said rotor and in another position of forming a continuation of said cylindrical wall;
   g. means for normally biasing each of said valves to said one position;
   h. cam means for turning the first valve against the action of said biasing means to an open position and cam means for maintaining the second valve in an open position;
   i. means angularly subsequent to said third valve for introducing an explosive fuel-air mixture to said rotor chamber;
   j. means between said first and second valves for igniting said mixture; and
   k. exhaust passage means opened by said third valve in said one position and closed thereby in the other position,
   whereby the advancing face of the lobe compresses said mixture prior to ignition and the explosive force is directed against the retreating face of the lobe after ignition, the exploded mixture is exhausted after the lobe passes the third valve, and a new fuel air mixture is introduced behind the retreating face of the lobe.

2. The engine of claim 1 wherein the rotor is provided with at least two lobes and the block is provided with at least two sets of valves.

3. A rotary internal combustion engine as defined in claim 2 wherein said means for normally biasing each of said valves to said one position comprises a spring means.

4. A rotary internal combustion engine as defined in claim 3, wherein the means for turning the second valve of each set of valves against the biasing means to the other position comprises the piston lobes.

5. A rotary internal combustion engine as defined in claim 1, wherein said cam means includes:
   a. a timing cam means rotable with the rotor; and,
   b. cam followers connected to each first and second valves in each set of valves and operatively engaged by said timing cam means.

6. A rotary internal combustion engine as defined in claim 1 wherein the position of the third valve of each set is changed by contact of the valve with the piston lobes.

7. A rotary internal combustion engine as defined in claim 5 wherein said timing cam means includes:
   a. a first cam having a cam lobe for engaging the cam follower on the first valve of said set of valves; and
   b. a second cam having a cam lobe for engaging the cam follower on the second valve of said set of valves.

* * * * *